Patented May 25, 1948

2,442,285

UNITED STATES PATENT OFFICE 2,442,285

PRODUCTION OF DIHALOGENATED SATURATED LOWER ALIPHATIC COMPOUNDS

Harry A. Cheney, Oakland, Calif., assignor to Shell Development Company, San Francisco, Calif., a corporation of Delaware No Drawing. Application January 9, 1945, Serial No. 572,096

12 Claims. (Cl. 260—652)

This invention relates to a process for the production of saturated poly-halogenated organic compounds from alcohols in the presence of a Deacon process catalyst. More particularly, the invention provides a process for the reaction of a saturated alcohol with a hydrogen halide and oxygen in the presence of a Deacon process catalyst to produce the corresponding saturated polyhalogenated organic compounds.

The process of the invention is particularly applicable to the production of di-halogenated aliphatic compounds from the saturated aliphatic and saturated cycloaliphatic monohydric alcohols. An especially suitable group of alcohols comprises the saturated lower aliphatic monohydric alcohols which are preferably primary or secondary, such as methanol, ethanol, propanol, dimethyl carbinol, n-butanol and methyl ethyl carbinol. The alcohols may be used singly or in admixture with each other, in the presence or absence of suitable diluents which must be substantially inert toward the reactants and/or products under the conditions of the reaction. The diluent may be present in an amount sufficient at least to bring about solution of portions of the reactants, but not enough to cause excessive dilution of the reactants or in any other way to interfere with the process of the invention. Since the process is not greatly affected by diluents, the process becomes particularly attractive economically when dilute alcohol solutions may be used as the source of the alcohol, or when unrectified alcohol solutions from the fermentation of waste organic materials may be employed as feeds.

The hydrogen halide which may be employed in effecting the process of the invention may be any hydrogen halide, particularly hydrogen chloride, hydrogen bromide or hydrogen iodide, and preferably hydrogen chloride. The specific hydrogen halide chosen will depend upon the specific halogenated aliphatic compound desired as the end product. The hydrogen halide may be employed per se or in the presence of diluents. For example, the source of hydrogen chloride may be aqueous hydrogen chloride or the hydrogen chloride recovered from plant wastes of industrial processes. Oxygen or any oxygen-containing gas may be used; for example, air may be used directly as the source of the oxygen.

The catalysts which are to be employed in effecting the process of the invention comprise the salts, particularly the halides, of metals having variable valences. These salts have been used as such, in combination with various promoting substances, and in combination with or disposed upon mineral substances such as asbestos, diatomaceous earth, pumice, clay, kieselguhr, thorium oxide, zirconium oxide, zinc oxide, iron oxide, chromium oxide, manganese oxide, magnesium oxide, bauxite, and are known in the art as "Deacon process catalysts." Examples of several suitable Deacon process catalysts may be found in United States Patents 2,191,980, 2,204,733 and 2,206,399. A particularly suitable catalyst comprises a copper halide or other halide of a metal of the transition series, which is in combination with or disposed upon an alumina. The catalyst may be in the form of a fine powder, in the form of pellets or other formed pieces of suitable size, or it may be in the form of fragments of suitable size. The preferred catalyst to be used in the execution of the process of the invention consists of or comprises a copper chloride in combination with or disposed upon an adsorptive alumina, the so-called activated alumina, which may or may not have been subjected to further treatment such as acid washing. Alumina catalysts which are characterized by their highly active adsorptive properties may be obtained from natural sources e. g. bauxite, or they may be prepared by synthetic means, and they may or may not be impregnated with or contain some other suitable substance.

The copper chloride, as stated above, may be disposed upon the mineral substance such as an adsorptive alumina. Some of these catalysts may be prepared by direct impregnation of the activated alumina with a solution of the copper chloride which it is desired to incorporate in the surface thereof, or they may be prepared indirectly, for example, by impregnation with one compound followed by a conversion treatment whereby said compound is converted to the desired compound. If it is desired to employ the catalyst in the form of pellets, the carrier such as the activated alumina may be ground to a powder, mixed with the copper chloride and the resulting mixture compressed into pellets of the desired form and size.

The catalyst compositions employed may include an alkali metal chloride, e. g. sodium chloride, to reduce the vapor pressure of the catalyst and reduce loss thereof by volatilization. They may also include binding materials such as magnesium phosphate, promoters such as lead chloride and any other constituents which may be advantageously incorporated in a Deacon process catalyst composition. A suitable catalyst, for example, comprises copper chloride and sodium chloride deposited upon or admixed with an adsorptive alumina consisting primarily of alumina alpha monohydrate.

The solid catalyst reagents consisting of or containing a halide of a metal of variable valence may be supported in the form of a bed or layer of granules, pills or fragments in a suitable reactor maintained at the desired temperature by external heating or cooling means, and the alcohol may be passed thereover at a suitable and desired rate and at a suitable pressure. The process may be interrupted at any convenient point to introduce new catalyst or to regenerate or reactivate the catalyst e. g. by oxidizing the catalyst to its original state of high valence. To avoid the necessity of intermittent operation caused by the use of a fixed catalyst requiring regeneration or reactivation at frequent intervals and to increase the amount of available catalyst contact surface, it may be desirable to employ a continuous method wherein the reaction is carried out under such conditions that there is an intimate and controllable contact between the alcohol and the solid reagent comprising or containing the metal halide, and wherein this metal halide having the metal reduced to a lower state of valence during the course of the reaction may be continuously withdrawn from the halogenation zone, reactivated and then returned for further use. This may be accomplished by employing the solid catalytic reagent containing or comprising the metal halide in the "fluid" state, that is, in the form of finely divided particles through which a stream containing or comprising the aliphatic alcohol may be passed under suitable conditions of pressure and temperature, and at such a speed as to maintain the solid particles in ebullient motion, thereby imparting to them the appearance of a boiling liquid. The solid catalyst particles consisting of or containing the metal halide which has been reduced to a lower state of valence may be separated from the reactants and products and regenerated by reacting with an oxygen-containing gas and the corresponding hydrogen halide. The method employing a "fluid" catalyst may be used in the intermittent halogenation process, but it is particularly applicable in a continuous process wherein the halogenation of the alcohol and the regeneration of the catalyst are effected simultaneously and continuously in separate zones.

A procedure involving simultaneous halogenation and catalyst regeneration in the same reaction zone may be employed wherein the alcohol, together with the hydrogen halide and oxygen or air, is conveyed through the reactor containing the catalyst, e. g. a copper chloride on an adsorptive alumina, or the catalyst may be introduced with the reactants. The catalyst may be fixed or in the fluid state. Since the catalyst is being regenerated simultaneously with the halogenation process in the same zone, the valence of the metal halide is adjusted according to the reaction conditions, and therefore the metal halide initially employed or introduced as fresh catalyst at any point in the reaction may be in any valence state. For example, cuprous chloride and/or cupric chloride may be employed in the reaction wherein the alcohol is reacted in the presence of hydrogen chloride and oxygen or air.

The reaction temperatures for the halogenation and reactivation steps will depend upon the specific reactants, the feed velocity, the proportions of the reactants, and the like. In general, a temperature should be maintained which is sufficient to bring the reactants into the vapor phase but which is not substantially above that temperature at which decomposition will occur, preferably between about 150° C. and about 350° C. However, with some alcohols and certain catalysts, higher or lower temperatures may also be employed. The reaction is preferably carried out at atmospheric pressure, but higher or lower pressures may be used.

The reaction is preferably conducted in the vapor phase and the vaporous reactants may be admixed or brought to reaction in any desired order or simultaneously. Since the reaction is quite exothermic, it is generally desirable to make provisions for removal of the heat of reaction. The temperature of the reaction between the alcohol, hydrogen halide and oxygen may be controlled to some extent by diluting the feed entering the reaction zone with an inert material which is in the gaseous state at the temperature of the reaction. Suitable substances for diluting the feed mixture comprise inert materials used singly or in admixture with each other which will not react with the reactants or products under the conditions of operation and which will not cause decomposition of the catalyst composition employed. Examples of these diluents are nitrogen, carbon dioxide, rare gases such as argon, and steam. The amount of diluent used may vary with the nature of the feed and with the operating conditions, but should be sufficient to keep the temperature of the reaction chamber at or below the desired level. If desired, diluents and/or one or more of the reactants may be introduced at a plurality of points in the reaction zone.

Any suitable ratio of reactants may be employed, and they may be passed over the catalyst at a velocity convenient to the maintenance of a suitable residence time in the catalyst chamber. The reaction may be carried out in any suitable type of apparatus depending upon the type of reaction, e. g. whether an intermittent or continuous process is employed, and whether a fixed or fluid catalyst is used, etc.

The invention is illustrated by the following examples.

*Example I*

A mixture comprising about 3 parts by weight of ethyl alcohol, about 6 parts by weight of air, about 5 parts by weight of hydrogen chloride and about 20 parts by weight of steam is passed into a single tube reactor heated to a temperature of about 230° C. and containing a cupric chloride catalyst comprising about 1 volume of a catalytic material prepared by impregnating alumina with sufficient cupric chloride and sodium chloride to form a composition containing about 14% of cupric chloride and about 5% of sodium chloride to about 9 volumes of granular alumina, and the reaction temperature is maintained within a temperature range of about 280° C. to 290° C. to produce a good yield of ethylene dichloride.

*Example II*

A mixture of hydrogen chloride, steam, air and isopropyl alcohol vapors in the ratio of about 1 part of vaporous isopropyl alcohol to 1 part of air to 1 part of hydrogen chloride to about 36 parts of steam is passed over a cupric chloride catalyst in a single tube reactor heated to a temperature of about 225° C. to 230° C., while maintaining the maximum temperature in the catalyst bed below about 260° C. to 275° C. to produce propylene dichloride.

*Example III*

A feed mixture comprising vaporous ethyl alcohol, air hydrogen chloride and water vapor is contacted with a cupric chloride-containing catalyst in a reaction chamber heated to about 225° C. and maintained at a pressure of about 35 to 40 pounds per square inch to produce ethylene dichloride.

*Example IV*

A total of about 16 moles of normal butyl alcohol and about 28 moles of hydrogen chloride is passed over a solid reagent consisting of about 557 grams of a 200 mesh activated alumina high in gamma alumina and containing about 15% by weight of cupric chloride deposited thereon in a reactor tube at a temperature of about 200° C. to produce butylene dichloride. Each cycle of operations consists of four stages, namely: (1) an oxidation stage during which the copper chloride was oxidized to its higher state of valence; (2) a flushing step during which all of the unreacted hydrogen chloride was removed; (3) the chlorination step; and (4) a second flushing stage to recover all of the organic reaction products.

I claim as my invention:

1. A process for the production of ethylene dichloride which comprises reacting ethyl alcohol with hydrogen chloride and oxygen in the vapor phase in the presence of a catalyst comprising cupric chloride, an adsorptive alumina and sodium chloride at a temperature between about 230° C. and about 290° C.

2. A process for the production of ethylene dichloride which comprises reacting ethyl alcohol with hydrogen chloride and oxygen in the vapor phase in the presence of cupric chloride at a temperature between about 150° C. and about 350° C.

3. A process for the production of butylene dichloride which comprises reacting normal butyl alcohol with hydrogen chloride and oxygen in the vapor phase in the presence of a catalyst comprising cupric chloride and adsorptive alumina at a temperature of about 200° C.

4. A process for the production of propylene dichloride which comprises reacting isopropyl alcohol with hydrogen chloride and oxygen in the vapor phase in the presence of a catalyst comprising copper chloride and an adsorptive alumina.

5. A process for the production of butylene dichloride which comprises reacting normal butyl alcohol with hydrogen chloride and oxygen in the vapor phase in the presence of cupric chloride.

6. A process for the production of a dichlorinated saturated lower aliphatic hydrocarbon which comprises reacting a saturated lower aliphatic primary monohydric alcohol with hydrogen chloride and oxygen in the vapor phase in the presence of a catalyst comprising a copper chloride and an adsorptive alumina at a temperature between about 150° C. and about 350° C.

7. A process for the production of a dichlorinated saturated lower aliphatic compound which comprises reacting a saturated lower aliphatic monohydric alcohol with hydrogen chloride and oxygen in the vapor phase in the presence of cupric chloride and an adsorptive alumina at a temperature between about 150° C. and about 350° C.

8. A process for the production of a dichlorinated saturated lower aliphatic compound which comprises reacting a saturated lower aliphatic monohydric alcohol with hydrogen chloride and oxygen in the vapor phase in the presence of a catalyst comprising a copper chloride and alumina.

9. A process for the production of a dichlorinated saturated lower aliphatic hydrocarbon which comprises reacting a saturated lower aliphatic monohydric alcohol with hydrogen chloride and oxygen in the vapor phase in the presence of a copper chloride.

10. A process for the production of a dichlorinated saturated lower aliphatic compound which comprises reacting a saturated lower aliphatic monohydric alcohol with hydrogen chloride and oxygen in the vapor phase in the presence of cupric chloride.

11. A process for the production of a dichlorinated saturated lower aliphatic compound which comprises reacting a saturated lower aliphatic monohydric alcohol with hydrogen chloride and oxygen in the vapor phase in the presence of a catalyst comprising alumina and the chloride of a vari-valent metal, at a temperature between about 150° C. and about 350° C.

12. A process for the production of a dihalogenated saturated lower aliphatic compound which comprises reacting a saturated lower aliphatic monohydric alcohol with a hydrogen halide and oxygen in the vapor phase in the presence of a halide of a variable valent metal.

HARRY A. CHENEY.

REFERENCES CITED

The following references are of record in the file of this patent:

UNITED STATES PATENTS

| Number | Name | Date |
|---|---|---|
| 1,391,758 | Buc | Sept. 27, 1921 |
| 1,920,246 | Daudt | Aug. 1, 1933 |
| 2,165,782 | Brooks | July 11, 1939 |

FOREIGN PATENTS

| Number | Country | Date |
|---|---|---|
| 108,421 | Austria | Dec. 27, 1927 |
| 486,952 | Germany | Nov. 30, 1929 |